(12) United States Patent
Choi et al.

(10) Patent No.: US 11,267,450 B2
(45) Date of Patent: Mar. 8, 2022

(54) DAMPER CONTROL METHOD FOR VEHICLE

(71) Applicants: Hyundai Motor Company, Seoul (KR); Kia Motors Corporation, Seoul (KR); Korea Advanced Institute of Science and Technology, Daejeon (KR)

(72) Inventors: Seong Jun Choi, Incheon (KR); Kyung Ho Kim, Seongnam-si (KR); In Yong Jung, Incheon (KR); Ki Cheol Jeong, Daejeon (KR); Sei Bum Choi, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 436 days.

(21) Appl. No.: 16/544,052

(22) Filed: Aug. 19, 2019

(65) Prior Publication Data
US 2020/0180591 A1    Jun. 11, 2020

(30) Foreign Application Priority Data

Dec. 6, 2018   (KR) .......................... 10-2018-0156088

(51) Int. Cl.
*B60W 10/22*   (2006.01)
*B60G 3/20*    (2006.01)
*B60W 40/13*   (2012.01)

(52) U.S. Cl.
CPC ............... *B60W 10/22* (2013.01); *B60G 3/20* (2013.01); *B60G 2600/02* (2013.01); *B60W 2040/1307* (2013.01)

(58) Field of Classification Search
CPC . B60W 10/22; B60W 2040/1307; B60G 3/20; B60G 2600/02; B60G 2400/10; B60G 2400/102; B60G 2400/202; B60G 2500/10; B60G 17/06; B60G 17/015; B60G 17/018; B60G 17/019; B60G 17/01933; B60G 2400/20; B60G 2400/60; B60G 2800/012; B60G 2800/014; B60G 2800/70

See application file for complete search history.

(56) References Cited

U.S. PATENT DOCUMENTS

2015/0290995 A1*   10/2015   Kanda ................ B60G 17/0182
                                                         701/37

FOREIGN PATENT DOCUMENTS

| KR | 10-2009-0094509 A | 9/2009 |
| KR | 10-0993168 B1 | 11/2010 |
| KR | 10-2018-0014599 A | 2/2018 |

* cited by examiner

*Primary Examiner* — Yuen Wong
(74) *Attorney, Agent, or Firm* — Morgan, Lewis & Bockius LLP

(57) ABSTRACT

A damper control method for a vehicle may achieve normal control of dampers by maintaining the ride comfort enhancement effect of the ECS while reducing manufacturing costs in accordance with a reduction in the number of sensors through elimination of wheel G-sensors.

10 Claims, 2 Drawing Sheets

DAMPER CONTROL METHOD FOR VEHICLE

CROSS-REFERENCE TO RELATED APPLICATION

The present application claims priority to Korean Patent Application No. 10-2018-0156088, filed on Dec. 6, 2018, the entire contents of which is incorporated herein for all purposes by this reference.

BACKGROUND OF THE INVENTION

Field of the Invention

The present invention relates to a damper control method for a vehicle, and more particularly to a damper control method for a vehicle which is capable of deriving a damper speed of a suspension without using wheel G-sensors.

Description of Related Art

Recently, an electronically controlled suspension (ECS) has been used to minimize vertical movement of a vehicle body (sprung mass) through control of dampers conducted in accordance with relative speed of a suspension and, as such, to achieve an enhancement in ride comfort.

A conventional ECS includes four dampers for providing damping force between a vehicle body and respective wheels, an electronic control unit (ECU) for controlling the dampers, a vehicle body sensor for calculating a vertical velocity of the vehicle body, and a wheel sensor for calculating a vertical velocity of the wheels.

However, the sensors mounted to the vehicle body and the wheels are expensive. Furthermore, there may be a problem in that the weight of the vehicle is increased due to mounting of the sensors, thereby having a negative effect on air-fuel ratio.

Therefore, it is necessary to provide a new damper control method capable of maintaining the ride comfort enhancement effect of the ECS while reducing the number of sensors, as compared to the conventional case.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a damper control method for a vehicle which is configured for controlling dampers while reducing manufacturing costs through a reduction in the number of sensors and maintaining the ride comfort enhancement effect of an electronically controlled suspension (ECS).

In accordance with an aspect of the present invention, the above and other objects may be accomplished by the provision of a damper control method for a vehicle including first determination for deriving a front wheel force value acting on a front wheel suspension, based on a previously stored vehicle weight value and a vertical acceleration value measured by a sensor, second determination for receiving the front wheel force value derived in the first determination, and of deriving a front wheel damper velocity value of the front wheel suspension, third determination for deriving a front wheel vertical velocity value, based on the front wheel damper velocity value derived in the second determination, estimating a rear wheel vertical velocity value, based on the derived front wheel vertical velocity value, and deriving a rear wheel damper velocity value, based on the estimated rear wheel vertical velocity value, and control operation for controlling dampers of the front and rear wheel suspensions, based on the front wheel damper velocity value of the front wheel suspension and the rear wheel damper velocity value of the rear wheel suspension.

The front wheel suspension may be divided into a left front wheel suspension and a right front wheel suspension. The rear wheel suspension may be divided into a left rear wheel suspension and a right rear wheel suspension. The damper velocity values of the front and rear wheel suspensions may be derived in association with the left and right ones of the front and rear wheel suspensions, respectively.

The front wheel force value may be derived in the first determination through the following expressions:

$$F_{L1} = \frac{1}{2}\left[\frac{1}{I_f + I_r}(I_r(m_s \cdot a_z) - I_y \cdot \ddot{\theta}) + \left(\frac{2}{d}I_x \cdot \ddot{\phi} - F_{L2} + F_{R2}\right)\right] \quad \text{Expression 1}$$

$$F_{R1} = \frac{1}{2}\left[\frac{1}{I_f + I_r}(I_r(m_s \cdot a_z) - I_y \cdot \ddot{\theta}) + \left(\frac{2}{d}I_x \cdot \ddot{\phi} - F_{L2} + F_{R2}\right)\right] \quad \text{Expression 2}$$

$F_{L1}$: a front wheel force value of the left front wheel suspension;
$F_{L2}$: a rear wheel force value of the left rear wheel suspension;
$F_{R1}$: a front wheel force value of the right front wheel suspension;
$F_{R2}$: a rear wheel force value of the right rear wheel suspension;
$m_s$: a weight of a vehicle body;
$a_z$: vertical acceleration;
$I_y$: pitch inertia;
$I_x$: roll inertia;
$\ddot{\theta}$: pitch acceleration;
$\ddot{\phi}$: roll acceleration; $I_f$: a distance between each front wheel and a vehicle body center; and
$I_r$: a distance between each rear wheel and the vehicle body center.

Expressions 1 and 2 may derive the front wheel force values through equations of vehicle model motion in a vertical direction, a pitch direction and a roll direction, and expressions representing the equations of motion in the vertical direction (Expression 3), the pitch direction (Expression 4) and the roll direction (Expression 5) may be as follows:

$$F_{L1} + F_{R1} = m_s \cdot a_z - F_{L2} - F_{R2} \quad \text{Expression 3}$$

$$F_{L1} + F_{R1} = \frac{1}{I_f}\left[I_r(F_{L2} + F_{R2}) - I_y \cdot \ddot{\theta}\right] \quad \text{Expression 4}$$

$$F_{L1} + F_{R1} = \frac{1}{I_f + I_r}\left[I_r(m_s \cdot a_z) - I_y \cdot \ddot{\theta}\right] \quad \text{Expression 5}$$

$F_{L2}$ and $F_{R2}$ may be set to an initial value of zero when initial front wheel force values are derived in the first determination, and, after derivation of $F_{L2}$ and $F_{R2}$, front wheel force values may be derived through substitution of the derived $F_{L2}$ and $F_{R2}$.

The second determination may receive the front wheel force values derived in the first determination, and may derive front wheel damper velocity values through the following expressions, based on the received front wheel force values:

$$F_{L1} = k_{L1} \cdot \Delta x_{L1} + b_{L1} \cdot \Delta \dot{x}_{L1} \quad \text{Expression 6:}$$

$$F_{R1} = k_{R1} \cdot \Delta x_{R1} + b_{R1} \cdot \Delta \dot{x}_{R1} \quad \text{Expression 7:}$$

$k_{L1}$, $k_{R1}$: spring constants;
$x_{L1}$, $x_{R1}$: front damper displacements;
$b_{L1}$, $b_{R1}$: damping coefficients; and
$\dot{x}_{L1}$, $\dot{x}_{R1}$: front wheel damper velocities.

The third determination may receive the front wheel damper velocity values derived in the second determination, and may derive front wheel vertical velocity values through the following expressions, based on the received front wheel damper velocity values:

$$V_{uL1} = V_{sL1} + \Delta \dot{x}_{L1} \quad \text{Expression 8:}$$

$$V_{uR1} = V_{sR1} + \Delta \dot{x}_{R1} \quad \text{Expression 9:}$$

$V_{uL1}$, $V_{uR1}$: front wheel vertical velocity values; and
$V_{sL1}$, $V_{sR1}$: front wheel vehicle body vertical velocity values.

After derivation of the front wheel vertical velocity values, the third determination may derive rear wheel vertical velocity values ($V_{uL2}$, $V_{uR2}$) through a delay according to a position difference between the front and rear wheels and a vehicle speed.

The third determination may derive rear damper speed values through the following expressions:

$$\Delta \dot{x}_{L2} = V_{uL2} - V_{sL2} \quad \text{Expression 10:}$$

$$\Delta \dot{x}_{R2} = V_{uR2} - V_{sR2} \quad \text{Expression 11:}$$

$\dot{x}_{L2}$, $\dot{x}_{R2}$: rear wheel damper velocity values; and
$V_{sL2}$, $V_{sR2}$: rear wheel vehicle body vertical velocity values.

The damper control method may further include fourth determination for deriving rear wheel force values acting on the rear wheel suspension, through the following expressions, based on the rear wheel damper velocity values derived in the third determination, after derivation of the rear wheel damper velocity values:

$$F_{L2} = k_{L2} \cdot \Delta x_{L2} + b_{L2} \cdot \Delta \dot{x}_{L2} \quad \text{Expression 12:}$$

$$F_{R2} = k_{R2} \cdot \Delta x_{R2} + b_{R2} \cdot \Delta \dot{x}_{R2} \quad \text{Expression 13:}$$

$k_{L2}$, $k_{R2}$: spring constants;
$x_{L2}$, $x_{R2}$: rear damper displacements;
$b_{L2}$, $b_{R2}$: damping coefficients; and
$\dot{x}_{L2}$, $\dot{x}_{R2}$: rear wheel damper velocities.

The vehicle damper control method configured as described above is configured for achieving normal control of dampers by maintaining the ride comfort enhancement effect of the ECS while reducing manufacturing costs in accordance with a reduction in the number of sensors through elimination of wheel G-sensors.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
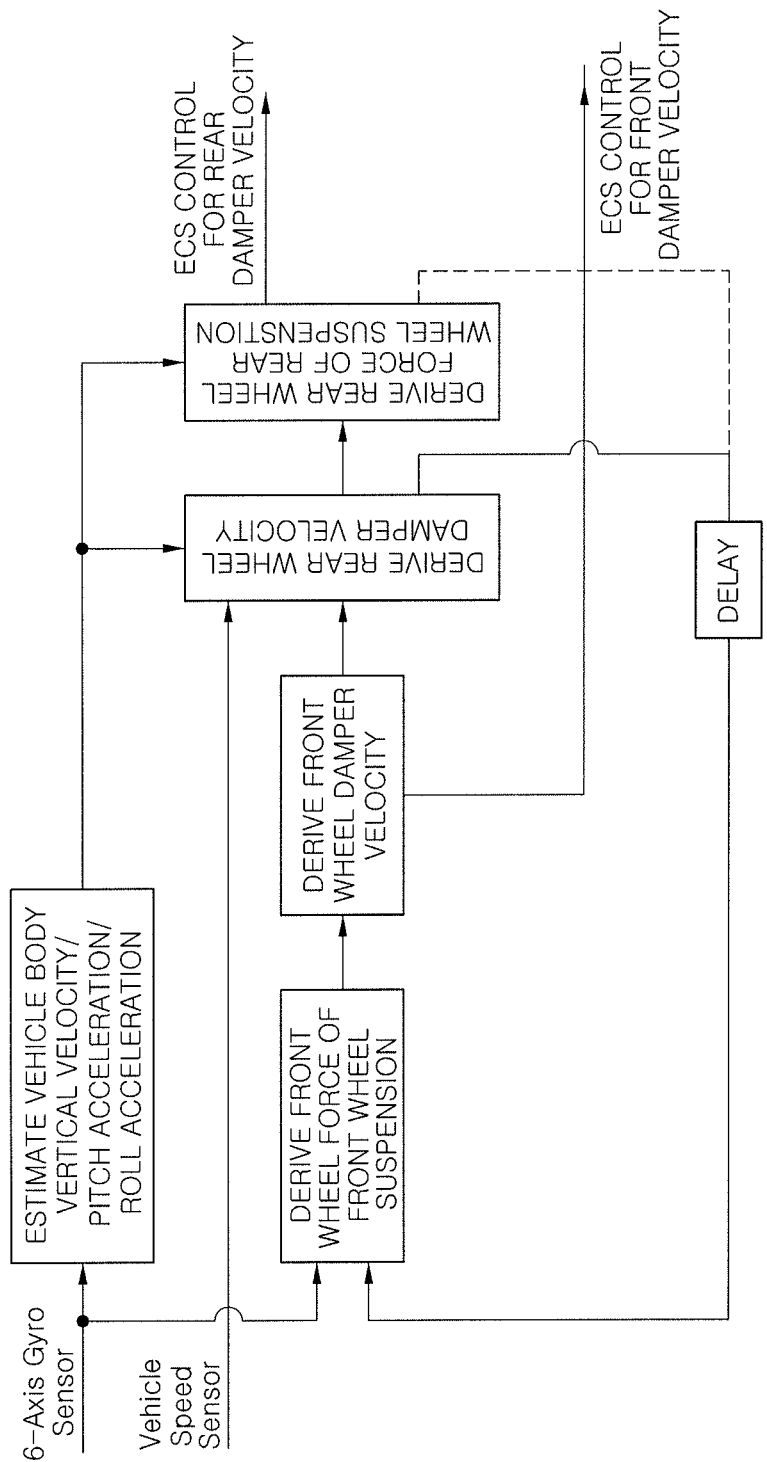
FIG. 1 is a block diagram of an estimation module for damper control for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention associated with a damper control method for a vehicle, examples of which are illustrated in the accompanying drawings. Wherever possible, the same reference numbers will be used throughout the drawings to refer to the same or like parts.

Figure 2:
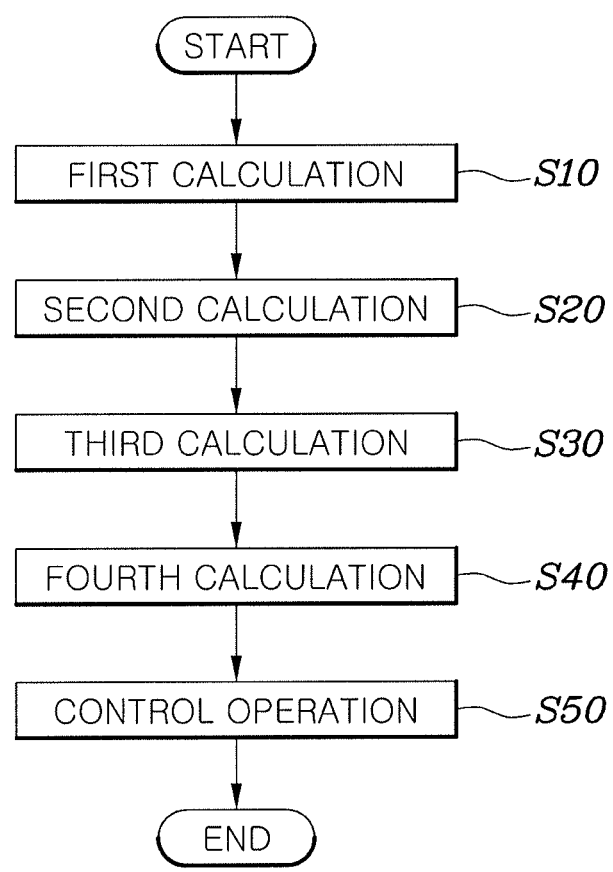
FIG. 2 is a flowchart of damper control for a vehicle according to the exemplary embodiment of the present invention.

FIG. 1 is a block diagram of an estimation module for damper control for a vehicle according to an exemplary embodiment of the present invention. FIG. 2 is a flowchart of damper control for a vehicle according to the exemplary embodiment of the present invention.

As illustrated in FIG. 1 and FIG. 2, the vehicle damper control method according to the exemplary embodiment of the present invention includes first calculation S10 for deriving a front wheel force value acting on a front wheel suspension, based on a previously stored vehicle weight value and a vertical acceleration value measured by a sensor, second calculation S20 for receiving the front wheel force value derived in the first calculation S10, deriving a front wheel damper velocity value of the front wheel suspension, third calculation S30 for deriving a front wheel vertical velocity value, based on the front wheel damper velocity value derived in the second calculation S20, estimating a rear wheel vertical velocity value, based on the derived front wheel vertical velocity value, and fourth calculation S40 for deriving a rear wheel damper velocity value, based on the estimated rear wheel vertical velocity value, and control operation S50 for controlling dampers of the front and rear wheel suspensions, based on the front wheel damper velocity value of the front wheel suspension and the rear wheel damper velocity value of the rear wheel suspension.

Here, the sensor may be constituted by a 6-axis gyro sensor, and the above-described control may be conducted in an electronic control unit (ECU). That is, in accordance with various aspects of the present invention, damper velocity is derived using the 6-axis gyro sensor, without using wheel G-sensors, and normal damper control is achieved based on the derived damper velocity.

In accordance with the exemplary embodiment of the present invention, in the first calculation S10, the front wheel force value acting on the front wheel suspension is derived, based on the previously stored vehicle weight value and the vertical acceleration value measured by the sensor. Here, the vehicle weight value is the weight of a vehicle body. The vertical acceleration value is input from a 6-axis gyro sensor. Based on the input vertical acceleration value and the vehicle weight value, the front wheel force value acting on the front wheel suspension may be derived.

After derivation of the front wheel force value as described above, the front damper velocity value is derived in the second calculation S20, based on the derived front wheel force value. Based on the derived front wheel damper velocity value, the front wheel vertical velocity value is derived in the third calculation S30. In the instant case, the front wheel vertical velocity value and the rear wheel vertical velocity value may be substantially equal while having different timings because the front wheels and the rear wheels travel along the same path. Thus, the rear wheel vertical velocity value may be estimated, based on the derived front wheel vertical velocity value. Based on the estimated rear wheel vertical velocity value, the rear wheel damper velocity value is then derived in the fourth calculation S34. In the control operation S50, accordingly, it may be possible to control the dampers of the front and rear wheel suspensions, based on the front wheel damper velocity value of the front wheel suspension and the rear wheel damper velocity value of the rear wheel suspension.

In an exemplary embodiment of the present invention, the front wheel suspension includes a left front wheel suspension and a right front wheel suspension, and the rear wheel suspension includes a left rear wheel suspension and a right rear wheel suspension. Accordingly, damper velocity values of the front and rear wheel suspensions are derived in association with the left and right ones of the front and rear wheel suspensions, respectively, and, as such, damper velocities for four axes of the vehicle are derived. Thus, normal operation of an electronically controlled suspension (ECS) may be conducted based on the damper velocities for the four axes of the vehicle.

Hereinafter, the present invention will be described in more detail. Front wheel force values may be derived in the first calculation S10 through the following expressions. That is, although the front wheel force values may be derived using existing wheel G-sensors, the front wheel force values are derived through the following expressions, without using wheel G-sensors:

$$F_{L1} = \frac{1}{2}\left[\frac{1}{I_f + I_r}(I_r(m_s \cdot a_z) - I_y \cdot \ddot{\theta}) + \left(\frac{2}{d}I_x \cdot \ddot{\phi} - F_{L2} + F_{R2}\right)\right] \quad \text{Expression 1}$$

$$F_{R1} = \frac{1}{2}\left[\frac{1}{I_f + I_r}(I_r(m_s \cdot a_z) - I_y \cdot \ddot{\theta}) + \left(\frac{2}{d}I_x \cdot \ddot{\phi} - F_{L2} + F_{R2}\right)\right] \quad \text{Expression 2}$$

where, "$F_{L1}$" is a front wheel force value of the left front wheel suspension, "$F_{L2}$" is a rear wheel force value of the left rear wheel suspension, "$F_{R1}$" is a front wheel force value of the right front wheel suspension, "$F_{R2}$" is a rear wheel force value of the right rear wheel suspension, "$m_s$" is the weight of the vehicle body, "$a_z$" is vertical acceleration, "$I_y$" is pitch inertia, "$I_x$" is roll inertia, "$\ddot{\theta}$" is pitch acceleration, "$\ddot{\phi}$" is roll acceleration, "$I_f$" is a distance between each front wheel and a vehicle body center, and "$I_r$" is a distance between each rear wheel and the vehicle body center. Here, the weight of the vehicle body is a previously stored value, and the vertical acceleration, the pitch inertia, the roll inertia, the pitch acceleration, and the roll acceleration are derived through the above-described sensor.

Expressions 1 and 2 derive the front wheel force values through equations of vehicle model motion in a vertical direction, a pitch direction and a roll direction. Expressions representing the equations of motion in the vertical direction (Expression 3), the pitch direction (Expression 4) and the roll direction (Expression 5) are as follows:

$$F_{L1} + F_{R1} = m_s \cdot a_z - F_{L2} - F_{R2} \quad \text{Expression 3}$$

$$F_{L1} + F_{R1} = \frac{1}{I_f}\left[I_r(F_{L2} + F_{R2}) - I_y \cdot \ddot{\theta}\right] \quad \text{Expression 4}$$

$$F_{L1} + F_{R1} = \frac{1}{I_f + I_r}\left[I_r(m_s \cdot a_z) - I_y \cdot \ddot{\theta}\right] \quad \text{Expression 5}$$

That is, the front wheel force value of the left front wheel suspension and the front wheel force value of the right front wheel may be derived by solving the equations of motion expressed by Expressions 3, 4 and 5 through co-substitution.

When initial front wheel force values are derived in the first calculation S10, "$F_{L2}$" and "$F_{R2}$" are set to an initial value, namely, zero. That is, in an exemplary embodiment of the present invention, "$F_{L2}$" and "$F_{R2}$" are derived based on the damper velocity value derived in association with the front wheel suspension and, as such, "$F_{L2}$" and "$F_{R2}$" have not been derived yet when "$F_{L1}$" and "$F_{R1}$" are initially derived. Accordingly, when "$F_{L1}$" and "$F_{R1}$" are initially derived, "$F_{L2}$" and "$F_{R2}$" are set to the initial value of zero. After derivation of "$F_{L2}$" and "$F_{R2}$", "$F_{L1}$" and "$F_{R1}$" are again derived through substitution of the derived "$F_{L2}$" and "$F_{R2}$". Thereafter, "$F_{L2}$" and "$F_{R2}$" are again derived, based on the corrected "$F_{L1}$" and "$F_{R1}$". Thus, it may be possible to reduce errors and, as such, to derive correct damper velocity values through repeated derivation of "$F_{L2}$" and "$F_{R2}$" based on the corrected "$F_{L1}$" and "$F_{R1}$" as described above.

Meanwhile, in the second calculation S20, the front wheel force values derived in the first calculation S10 are input, and front wheel damper velocity values may be derived through the following expressions, based on the input front wheel force values:

$$F_{L1} = k_{L1} \cdot \Delta x_{L1} + b_{L1} \cdot \Delta \dot{x}_{L1} \quad \text{Expression 6:}$$

$$F_{R1} = k_{R1} \cdot \Delta x_{R1} + b_{R1} \cdot \Delta \dot{x}_{R1} \quad \text{Expression 7:}$$

where, "$k_{L1}$" and "$k_{R1}$" are spring constants, "$\Delta X_{L1}$" and "$\Delta X_{R1}$" are front damper displacements, "$b_{L1}$" and "$b_{R1}$" are damping coefficients, and "$\Delta \dot{X}_{L1}$" and "$\Delta \dot{X}_{R1}$" are front wheel damper velocities. The spring constants, the front wheel damper displacements and the damping coefficients may be equal when the suspensions of the vehicle have the same specifications. Alternatively, the damping coefficients may be set to differ from each other in association with the left and right suspensions.

That is, "$\dot{x}_{L1}$" and "$\dot{x}_{R1}$" may be derived through the following Expressions 6-1 and 7-1 while using the above-described Expressions 6 and 7.

$$\Delta \dot{x}_{L1} = \frac{1}{b_{L1}} \cdot (-k_{L1} \cdot \Delta x_{L1} + F_{L1}) \qquad \text{Expression 6-1}$$

$$\Delta \dot{x}_{R1} = \frac{1}{b_{R1}} \cdot (-k_{R1} \cdot \Delta x_{R1} + F_{R1}) \qquad \text{Expression 7-1}$$

After the left front wheel damper velocity "$\dot{x}_{L1}$" and the right front wheel damper velocity "$\dot{x}_{R1}$" are derived, control of the ECS may be conducted at the damper velocities derived in association with the front wheel suspension.

Meanwhile, in the third calculation S30, the front wheel damper velocity values derived in the second calculation S20 are input, and front wheel vertical velocity values may be derived through the following expressions, based on the input front wheel damper velocity values:

$$V_{uL1} = V_{sL1} + \Delta \dot{x}_{L1} \qquad \text{Expression 8:}$$

$$V_{uR1} = V_{sR1} + \Delta \dot{x}_{R1} \qquad \text{Expression 9:}$$

where, "$V_{uL1}$" and "$V_{uR1}$" are front wheel vertical velocity values, and "$V_{sL1}$" and "$V_{sR1}$" are front wheel vehicle body vertical velocity values. Although such wheel vertical velocity values may be derived using existing wheel G-sensors, the wheel vertical velocity values are derived through the above expressions, without using wheel G-sensors.

After the front wheel vertical velocity values are derived in the above-described manner, rear wheel vertical velocity values "$V_{uL2}$" and "$V_{uR2}$" may be derived through delay of the derived front wheel vertical velocity values according to a position difference between the front wheels and the rear wheels and the speed of the vehicle.

That is, the front wheels and the rear wheels of the vehicle travel along similar paths, and, as such, the front wheel vertical velocity value and the rear wheel vertical velocity value are equal. However, since the front wheels and the rear wheels are spaced from each other, the damper control timing of the rear wheels may be delayed for a certain time from the damper control timing of the front wheels in accordance with the distance $I_f$ between each front wheel and the vehicle body center, the distance $I_r$ between each rear wheel and the vehicle body center, and the travel speed of the vehicle. In accordance with the delay, it may be possible to achieve correct damper control timings of the front and rear wheels during control of the ECS. Accordingly, the rear wheel vertical velocity value is derived after a delay from derivation of the front wheel vertical velocity value.

Thereafter, in the third calculation S30, the rear wheel damper velocity value may be derived through the following expressions:

$$\Delta \dot{x}_{L2} = V_{uL2} - V_{sL2} \qquad \text{Expression 10:}$$

$$\Delta \dot{x}_{R2} = V_{uR2} - V_{sR2} \qquad \text{Expression 11:}$$

where, "$\Delta \dot{x}_{L2}$" and "$\Delta \dot{x}_{R2}$" are rear wheel damper velocities, and "$V_{sL2}$" and "$V_{sR2}$" are rear wheel vehicle body vertical velocity values.

After the left rear wheel damper velocity $\dot{x}_{L2}$ and the right rear wheel damper velocity $\dot{x}_{R2}$ are derived in the above-described manner, control of the ECS may be conducted at the damper velocities derived in association with the rear wheel suspension.

Meanwhile, the vehicle damper control method according to the exemplary embodiment of the present invention may further include fourth calculation S40 for deriving rear wheel force values acting on the rear wheel suspension, based on the rear wheel damper velocity values derived in the third calculation S30, after derivation of the rear wheel damper velocity values. The rear wheel force values may be derived through the following expressions:

$$F_{L2} = k_{L2} \cdot \Delta x_{L2} + b_{L2} \cdot \Delta \dot{x}_{L2} \qquad \text{Expression 12:}$$

$$F_{R2} = k_{R2} \cdot \Delta x_{R2} + b_{R2} \cdot \Delta \dot{x}_{R2} \qquad \text{Expression 13:}$$

where, "$k_{L2}$" and "$k_{R2}$" are spring constants, "$\Delta X_{L2}$" and "$\Delta X_{R2}$" are rear damper displacements, "$b_{L2}$" and "$b_{R2}$" are damping coefficients, and "$\Delta \dot{x}_{L2}$" and "$\Delta \dot{x}_{R2}$" are rear wheel damper velocities. The spring constants, the rear wheel damper displacements and the damping coefficients may be equal when the suspensions of the vehicle have the same specifications. Alternatively, the damping coefficients may be set to differ from each other in association with the left and right suspensions.

After derivation of the rear wheel force values, derivation of front wheel force values is conducted again. In this manner, corrected front wheel force values are derived through substitution of finally derived rear wheel force values. In this manner, damper velocity values are repeatedly corrected and, as such, errors thereof are repeatedly reduced. As a result, correct damper velocity values may be derived.

The vehicle damper control method configured as described above in accordance with various aspects of the present invention is configured for achieving normal control of dampers by maintaining the ride comfort enhancement effect of the ECS while reducing manufacturing costs in accordance with a reduction in the number of sensors through elimination of wheel G-sensors.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A damper control method for a vehicle, the method comprising:
   in a first determination, deriving front wheel force values acting on a front wheel suspension, based on a previously stored vehicle weight value and a vertical acceleration value measured by a sensor;

in a second determination, receiving the front wheel force values derived in the first determination, and deriving a front wheel damper velocity value of the front wheel suspension;

in a third determination, deriving a front wheel vertical velocity value, based on the front wheel damper velocity value derived in the second determination, estimating a rear wheel vertical velocity value, based on the derived front wheel vertical velocity value, and deriving a rear wheel damper velocity value, based on the estimated rear wheel vertical velocity value; and at last, controlling, by a controller, dampers of the front and rear wheel suspensions, based on the front wheel damper velocity value of the front wheel suspension and the rear wheel damper velocity value of the rear wheel suspension.

2. The damper control method according to claim 1,
wherein the front wheel suspension includes a left front wheel suspension and a right front wheel suspension,
wherein the rear wheel suspension includes a left rear wheel suspension and a right rear wheel suspension, and
wherein the damper velocity values of the front and rear wheel suspensions are derived in association with the left and right front wheel suspensions of the front wheel suspension and the left and right rear wheel suspensions of the rear wheel suspension, respectively.

3. The damper control method according to claim 1, wherein the front wheel force values are derived in the first determination through the following expressions 1 and 2:

$$F_{L1} = \frac{1}{2}\left[\frac{1}{I_f+I_r}(I_r(m_s \cdot a_z) - I_y \cdot \ddot{\theta}) + \left(\frac{2}{d}I_x \cdot \ddot{\phi} - F_{L2} + F_{R2}\right)\right] \quad \text{Expression 1}$$

$$F_{R1} = \frac{1}{2}\left[\frac{1}{I_f+I_r}(I_r(m_s \cdot a_z) - I_y \cdot \ddot{\theta}) + \left(\frac{2}{d}I_x \cdot \ddot{\phi} - F_{L2} + F_{R2}\right)\right] \quad \text{Expression 2}$$

$F_{L1}$: a front wheel force value of the left front wheel suspension;
$F_{L2}$: a rear wheel force value of the left rear wheel suspension;
$F_{R1}$: a front wheel force value of the right front wheel suspension;
$F_{R2}$: a rear wheel force value of the right rear wheel suspension;
$m_s$: a weight of a vehicle body;
$a_z$: vertical acceleration;
$a_z$: vertical acceleration;
$I_y$: pitch inertia;
$I_x$: roll inertia;
$\ddot{\theta}$: pitch acceleration;
$\ddot{\phi}$: roll acceleration;
$I_f$: a distance between each front wheel and a vehicle body center; and
$I_r$: a distance between each rear wheel and the vehicle body center.

4. The damper control method according to claim 3, wherein Expressions 1 and 2 derive the front wheel force values through equations of vehicle model motion in a vertical direction, a pitch direction and a roll direction, Expression 3 representing an equation of motion in the vertical direction, Expression 4 representing an equation of motion in the pitch direction, and Expression 5 representing an equation of motion in the roll direction are as follows:

$$F_{L1} + F_{R1} = m_s \cdot a_z - F_{L2} - F_{R2} \quad \text{Expression 3}$$

$$F_{L1} + F_{R1} = \frac{1}{I_f}\left[I_r(F_{L2} + F_{R2}) - I_y \cdot \ddot{\theta}\right] \quad \text{Expression 4}$$

$$F_{L1} + F_{R1} = \frac{1}{I_f + I_r}\left[I_r(m_s \cdot a_z) - I_y \cdot \ddot{\theta}\right] \quad \text{Expression 5}$$

5. The damper control method according to claim 3,
wherein $F_{L2}$ and $F_{R2}$ are set to an initial value of zero when initial front wheel force values are derived in the first determination, and, after derivation of $F_{L2}$ and $F_{R2}$, front wheel force values are derived through substitution of the derived $F_{L2}$ and $F_{R2}$.

6. The damper control method according to claim 3,
wherein the second determination receives the front wheel force values derived in the first determination, and derives front wheel damper velocity values through the following Expressions 6 and 7, based on the received front wheel force values:

$$F_{L1} = k_{L1} \cdot \Delta x_{L1} + b_{L1} \cdot \Delta \dot{x}_{L1} \quad \text{Expression 6:}$$

$$F_{R1} = k_{R1} \cdot \Delta x_{R1} + b_{R1} \cdot \Delta \dot{x}_{R1} \quad \text{Expression 7:}$$

$k_{L1}$, $k_{R1}$: spring constants;
$\Delta X_{L1}$, $\Delta X_{R1}$: front damper displacements;
$b_{L1}$, $b_{R1}$: damping coefficients; and
$\Delta \dot{x}_{L1}$, $\Delta \dot{x}_{R1}$: front wheel damper velocities.

7. The damper control method according to claim 6, wherein the third determination receives the front wheel damper velocity values derived in the second determination, and derives front wheel vertical velocity values through the following Expressions 8 and 9, based on the received front wheel damper velocity values:

$$V_{uL1} = V_{sL1} + \Delta \dot{x}_{L1} \quad \text{Expression 8:}$$

$$V_{uR1} = V_{sR1} + \Delta \dot{x}_{R1} \quad \text{Expression 9:}$$

$V_{uL1}$, $V_{uR1}$: front wheel vertical velocity values; and
$V_{sL1}$, $V_{sR1}$: front wheel vehicle body vertical velocity values.

8. The damper control method according to claim 7,
wherein, after derivation of the front wheel vertical velocity values, the third determination derives rear wheel vertical velocity values ($V_{uL2}$, $V_{uR2}$) through a delay according to a position difference between the front and rear wheels and a vehicle speed.

9. The damper control method according to claim 8,
wherein the third determination derives rear damper speed values through the following Expressions 10 and 11:

$$\Delta \dot{x}_{L2} = V_{uL2} - V_{sL2} \quad \text{Expression 10:}$$

$$\Delta \dot{x}_{R2} = V_{uR2} - V_{sR2} \quad \text{Expression 11:}$$

$\Delta \dot{x}_{L2}$, $\Delta \dot{x}_{R2}$: rear wheel damper velocities; and
$V_{sL2}$, $V_{sR2}$: rear wheel vehicle body vertical velocity values.

10. The damper control method according to claim 9, further comprising:
in a fourth determination, deriving rear wheel force values acting on the rear wheel suspension, through the following Expressions 12 and 13, based on the rear wheel damper velocity values derived in the third determination, after derivation of the rear wheel damper velocity values:

$$F_{L2} = k_{L2} \cdot \Delta x_{L2} + b_{L2} \cdot \Delta \dot{x}_{L2} \quad \text{Expression 12:}$$

$$F_{R2} = k_{R2} \cdot \Delta x_{R2} + b_{R2} \cdot \dot{x}_2 \quad \text{Expression 13:}$$

$k_{L2}$, $k_{R2}$: spring constants;
$\Delta X_{L2}$, $\Delta X_{R2}$: rear damper displacements;
$b_{L2}$, $b_{R2}$: damping coefficients; and
$\Delta \dot{x}_{L2}$, $\Delta \dot{x}_{R2}$: rear wheel damper velocities.

* * * * *